(12) United States Patent
Moyer

(10) Patent No.: US 9,641,418 B1
(45) Date of Patent: May 2, 2017

(54) USE OF PHYSICAL LOCATION AND TIMING DELAY IN FRAUD DETECTION

(75) Inventor: Steven W. Moyer, Boalsburg, PA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 737 days.

(21) Appl. No.: 12/868,045

(22) Filed: Aug. 25, 2010

(51) Int. Cl.
*G08B 1/08* (2006.01)
*H04L 12/26* (2006.01)

(52) U.S. Cl.
CPC .................................... *H04L 43/16* (2013.01)

(58) Field of Classification Search
USPC ................... 725/107; 340/539.14, 539.15
See application file for complete search history.

(56) References Cited

U.S. PATENT DOCUMENTS

| | | | |
|---|---|---|---|
| 7,783,019 B2* | 8/2010 | Mahone et al. | 379/114.14 |
| 2005/0183130 A1* | 8/2005 | Sadja et al. | 725/107 |
| 2005/0212504 A1* | 9/2005 | Revital et al. | 324/100 |
| 2005/0278542 A1* | 12/2005 | Pierson et al. | 713/182 |
| 2008/0201785 A1* | 8/2008 | Overcash | H04N 7/17318 726/35 |

\* cited by examiner

*Primary Examiner* — Nabil Syed
*Assistant Examiner* — Kevin Lau
(74) *Attorney, Agent, or Firm* — Stewart M. Wiener

(57) ABSTRACT

Using timing delays associated with user devices on a network and the demographics of the neighborhood(s) in which the user devices reside to determine whether to generate a fraud alert.

13 Claims, 6 Drawing Sheets

USE OF PHYSICAL LOCATION AND TIMING DELAY IN FRAUD DETECTION

TECHNICAL FIELD

This disclosure relates to the use of physical location and timing delay to detect fraud.

BACKGROUND

The Data-Over-Cable Service Interface Specification (DOCSIS) was established by cable television network operators (also referred to as multiple service operators or MSOs) to facilitate transporting data traffic, primarily Internet traffic, over existing community antenna television (CATV) networks. In addition to transporting data traffic, as well as television content signals over a CATV network, MSOs can also use their CATV network infrastructure for carrying voice, video on demand (VoD) and video conferencing traffic signals, among other types.

Subscribers can access these services through user devices, which can include, for example, cable modems, embedded multimedia terminal adapters (EMTAs) (also known as cable telephony modems), set-top boxes, or gateway devices. A subscriber can have one or more user devices capable of receiving data services registered with a service provider, such as an MSO. Once a device is registered to a subscriber, its identifier, for example its media access control (MAC) address, can be used to authorize it to receive signals, including those for data service. If a subscriber were to provide one of his or her devices to a non-subscriber such as, for example a neighbor, the device might still be authorized by the network to receive signals, resulting in the provision of services to both the subscriber and the non-subscriber user. The subscriber might, for example, decide to split the bill for services with the non-subscriber. As another example, the movement can be of a DOCSIS compliant set-top box. Typically, discounts are provided for the second (or more) set-top boxes that a subscriber has in his or her home. Whatever type of arrangement exists between the subscriber and the unauthorized user, there is the potential that a service provider such as an MSO can lose a substantial amount of revenue due to such fraudulent sharing of devices. Further, determining whether a device is no longer where it was originally installed can be used in the emergency 911 context as well, wherein operators would like to determine the origin of a call.

BRIEF DESCRIPTION OF THE DRAWINGS

Like reference numbers and designations in the various drawings indicate like elements.

DETAILED DESCRIPTION

In some implementations of this disclosure, systems and methods can operate to alert of possible fraud resulting in the movement of an authorized device from one physical location to another, and in particular from a location owned or rented by a subscriber to another location owned or rented by a non-subscriber.

Figure 1:
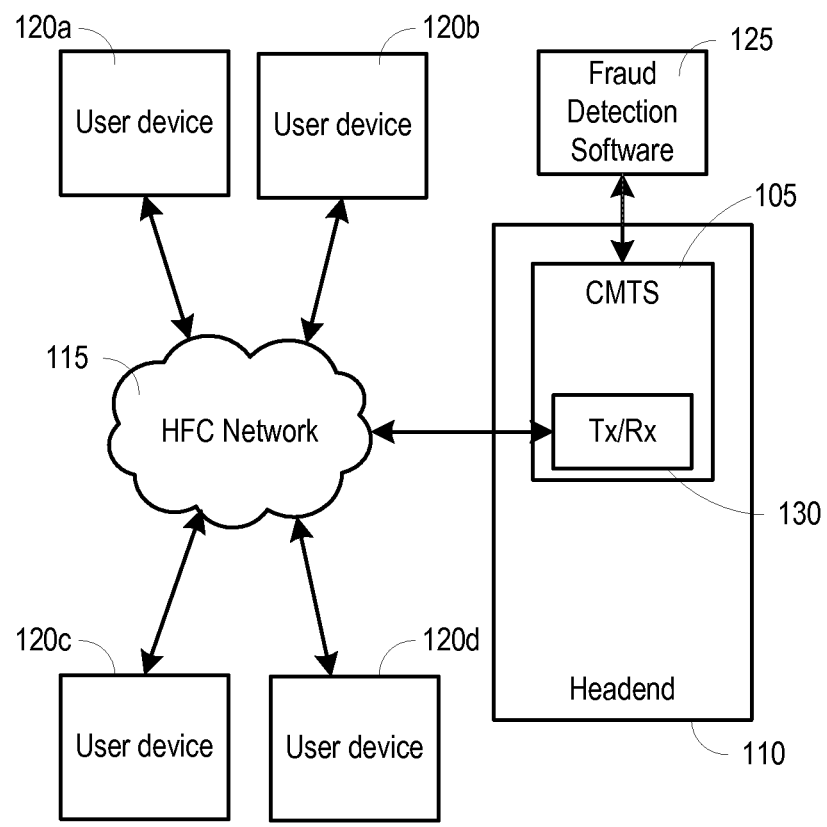
FIG. 1 is a block diagram illustrating an example network environment showing an HFC network coupled to a headend and multiple user devices.

FIG. 1 is a block diagram illustrating an example network environment 100 that can include a modulation/demodulation device, such as a cable modem termination system (CMTS) 105 located at a network provider's edge serving office. By way of example, the office can be, for example, a headend 110 of a multiple service operator (MSO), such as a cable company. FIG. 1 can also include one or more transport networks connecting the headend to user devices, such as a Hybrid Fiber-Coaxial ("HFC") network 115, through which one or more user devices 120a-d can communicate with the CMTS 105. It should be understood that only four user devices 120a-d are shown (for illustrative purposes), but more are typically deployed. FIG. 1 can also include a software program or module 125 operable to obtain and process information to alert of possible fraud. In addition to a network that uses cable infrastructure, it should also be understood that any network in which an authorized user device can be moved from one physical location to another and still be recognized as authorized to receive signals is contemplated to be within the scope of this disclosure.

In some implementations, a headend 110 can provide video, data and voice service to a subscriber. The CMTS 105 can include a processor, a memory, and a storage device. The CMTS 105 can also have one or more transmitters/receivers 130 for transmitting signals through one or more transport networks, including the HFC network 115, to one or more user devices 120a-d. The transmitters/receivers 130 can be one or more separate transmitter and receiver components residing on the same board, or separate boards; further, the transmitter and receiver can also include various sub-components, such as modulators and demodulators. The CMTS 105 can also receive data signals from user devices through one or more transport networks, including the HFC network 115.

The example HFC network 115 can use a combination of optical fibers and coaxial cable to send data to and receive data from the headend 110. The HFC network 115 can be bi-directional, wherein signals are carried in both directions on the same network from the headend 110 to the user devices 120a-d, and from the user devices 120a-d to the headend 110. The downstream signals, which can also be referred to as forward-path signals, carry information from the headend 110 to the home such as video content, voice, and internet data. The upstream signals, which may also be referred to as return-path signals, carry information from user devices to the headend 110, such as control signals to order a movie, or internet data such as email.

The optical fiber portion of an HFC network 115 can extend from the headend 110 (e.g., including centralized, local or regional headends) to a hubsite for one or more neighborhoods, and then to a fiber optic node. The co-axial portion of an HFC network 115 uses co-axial cable connecting the fiber optic node to a plurality of homes having end user devices 120a-d. In example implementations, the HFC transmitter/receiver 130 can transmit communications directly to an HFC network (e.g., HFC network 115 of FIG. 1). In other implementations, the HFC/modulation interface 340 can transmit communications to a modulator (e.g., an EQAM, combiner, mixer, etc.) for generation of an RF signal for transmission on an HFC network. The various signals from the headend 110 may be encoded, modulated, and/or upconverted onto RF carriers, combined onto an electrical signal, and inserted into a broadband optical transmitter. The broadband optical transmitter can be operable to convert the electrical signal to a downstream optically modulated signal that is sent to one or more fiber optic nodes. An example fiber optic node has a broadband optical receiver which converts the downstream optically modulated signal into an electrical signal operable to propagate through co-axial cables to end user devices 120a-d. The downstream electrical signal can be a radio frequency (RF) modulated signal. The forward-path and the return-path may be carried over the same coaxial cable in both directions between the optical node and the end user devices. To prevent interference of signals, the frequency band may be divided into two or more sections in which at least one frequency band carries forward-path signals, and at least another that carries return-path signals. For the at least one return path, one of the user devices 120a-d transmits on a given frequency at any given time. However, it should be noted that multiple user devices 120a-d can transmit at different frequencies simultaneously. Typically, requests for upstream bandwidth are made by the user devices 120a-d. The CMTS 105 might grant or deny such requests based upon various characteristics such as, for example, network usage, previous requests for grants, etc. In some implementations, the CMTS 105 can generate one or more transmission maps that allocate user devices 120a-d a specific time slot and frequency at which the user devices 120a-d may transmit. The transmission maps can be generated using, for example, an enhanced concatenation and fragmentation algorithm such as specified in DOCSIS 3.0, or any other suitable algorithm.

The transport network connecting the headend to user devices can also include one or more radio frequency over glass (RFoG) networks, which can be deployed with an existing HFC network 115. An RFoG topology includes an all-fiber service from the headend 110 to a field node, or optical network unit (ONU), which is typically located at or near the user's premises. Coaxial cable can be used to connect the ONUs of an RFoG network to one or more user devices 120a-d. In the headend, a downstream laser sends a broadcast signal that is optically split a multitude of times. The optical network unit, or ONU, recovers the RF broadcast signal and passes it into the subscriber's coax network.

Upstream transmissions from the user devices 120a-d can pass through an RFoG network and be received by an RFoG transmitter/receiver at the headend. The user devices 120a-d can transmit RF signals to their respective ONUs. The ONUs can modulate the upstream RF traffic onto optical channels and sends those signals to an optical splitter, which then passes on the signals on the optical channels to the RFoG transmitter/receiver. In various implementations, the RFoG transmitter/receiver can be one or more separate transmitter and receiver components residing on the same board, or alternatively separate boards; further, the transmitter and receiver can also include various sub-components, such as modulators and demodulators. The RFoG transmitter/receiver receives the optically modulated signals on optical channels and demodulates the signals into the electrical signals, which can be RF signals. Signals from the RFoG network can then be combined with one or more RF signals coming from other HFC networks such as HFC network 115, or from other RFoG networks using an RF combiner, before being received by the CMTS transmitter/receiver 130.

FIG. 1 also shows one or more software programs or modules, fraud detection software 125, operable to use information regarding the physical location of a user device and timing delays associated with the device at different times to alert of possible fraud. The software can reside, for example, in the CMTS 105, or on a blade of the CMTS 105, or on a separate computer. The fraud detection software 125 can also be operable to request and obtain subscriber information, and also information on timing delays associated with the device at different times. Such information can reside in one or more databases, which can be associated with a subscriber billing system, the CMTS 105, a provisioning system, or any other databases.

Figure 2:
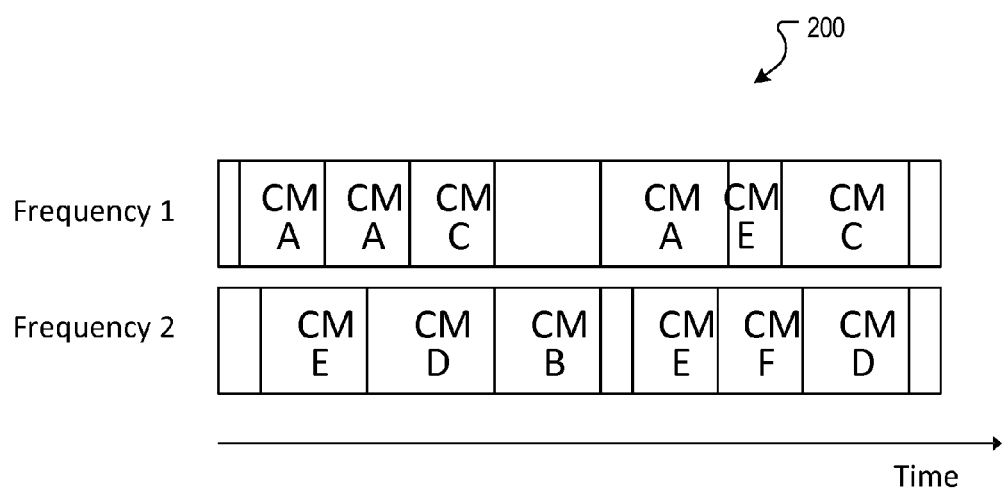
FIG. 2 is a diagram illustrating an example transmission map scheduling the transmission of data by user devices.

FIG. 2 illustrates an example transmission map 200 having one or more frequencies, and one or more time slots (also referred to as burst frames) for each frequency, wherein the user devices (e.g., user devices 120 of FIG. 1) can be, for example, cable modems A, B, C, D, E, and F coupled to an HFC network (e.g., HFC network 115 of FIG. 1). While six devices and two frequencies are shown for illustrative purposes, more frequencies, more user devices can be employed. The transmission map 200 can be allocated such that the user devices on the HFC network can transmit over different frequencies at the same time, consistent with DOCSIS 3.0 upstream channel bonding.

A transmission map 200 allows for a user device to determine when and at what frequency to transmit information so as to avoid conflicts that can result in the loss of data. User devices can connect to the transport network at various physical locations. Based on a number of factors, including, for example, the varying distance of each user device from the headend, it can take a signal longer to reach the headend if it is transmitted from one device versus another, even if both transmissions occur at the same time. Because of such a timing delay, timing offsets are associated with each user device so that the timing delay is accounted for by user devices that transmit according to a transmission map 200. Without timing offsets, the potential exists that one user device transmission can overlap with that of another user device, resulting in collisions and possible loss of data that might require a re-transmission.

Returning to FIG. 1, when a user device 120 is initially connected to the network, for example when a cable modem is connected to a coaxial outlet in a residence, several processes can be performed. For example, the CMTS 105 might obtain the Media Access Control address of the device (the "MAC" address) and associate it with the user's subscriber account, which can contain billing information, such as, for example, the subscriber's address.

Although various implementations can be used to determine the timing delay of a device's transmission to a receiving device, a synchronization process can be performed whereby transmissions are sent between the headend 110 and the user device 120 to determine the timing delay of the user device 120 and the appropriate timing offset needed to account for the timing delay. As mentioned above, such a timing delay might also exist for other devices and other architectures, such as the timing delay of a DSL modem transmitting to a DSLAM at a central office of a telephone company.

In an implementation employing DOCSIS, the CMTS 105 sends a "SYNC message" to a user device 120. Upon receiving the SYNC message, the user device 120 sets its system clock to time unit 0. If, for example, a time unit of 3 has passed, then the CMTS 105 clock time will read 3 when the user device clock time has been set to 0.

The CMTS 105 will then send a MAP message (transmission map message) instructing the user device 120 to send a "Ranging Request" to the CMTS 105. For example, the CMTS 105 might send the MAP message at CMTS 105 clock time 5, asking the user device 120 to transmit the ranging request at the user device 120 clock time 12. By the time the user device 120 receives the message, the user device 120 time will be 8. The user device 120 will send out the ranging request according to its own clock at time 12. With a one-trip delay of 3 time units, by the time the ranging request is received by the CMTS 105, the user device 120 time clock will read 15 and the CMTS 105 time clock will read 18. In this example, the CMTS 105 asked for the user device 120 to transmit at CMTS 105 time clock 12. If there were no timing delays at all, it would have received a ranging request at 12. Because of the round-trip delay of 6 time units, the CMTS 105 received the ranging request from the user device 120 at CMTS 105 time clock 18. The CMTS 105 then sends a "Ranging Response" message to the user device 120 letting it know that its timing offset is 6 time units.

When the CMTS 105 sends a transmission map, for example the transmission map like the one shown in FIG. 2, to the user device 120 letting it know during which time slots it should transmit, the user device 120 will use the timing offset to make sure that the CMTS 105 begins to receive data at the requested allocated start time. Thus, a CMTS 105 might send a transmission map indicating that user device 120a is allotted a time slot starting at T=30, meaning that the CMTS 105 expects to begin receiving transmissions from user device 120a starting at CMTS time clock 30. Using the offset of six derived from the example above, because the user device 120a clock is already 3 units ahead, and it will take 3 time units for a transmission to get to the CMTS 105, the user device 120a will send out its transmission at user device 120 clock time T-6, which is user device 120a time 30-6=24. The transmission would arrive at CMTS 105 time 30. Units of time can be expressed in DOCSIS "ticks" wherein each tick=6.25 µsec. The timing offset can be quoted in units of ¹⁄₆₄th of a DOCSIS tick, which makes one Time Offset unit equal to 97.65625 nanoseconds.

It should be noted again that various implementations using offsets and ranging can be used to determine the timing delay of a device's transmission to a receiving device, including a high resolution timing offset available in some versions of DOCSIS, and methods used in non-DOCSIS networks.

Figure 3:
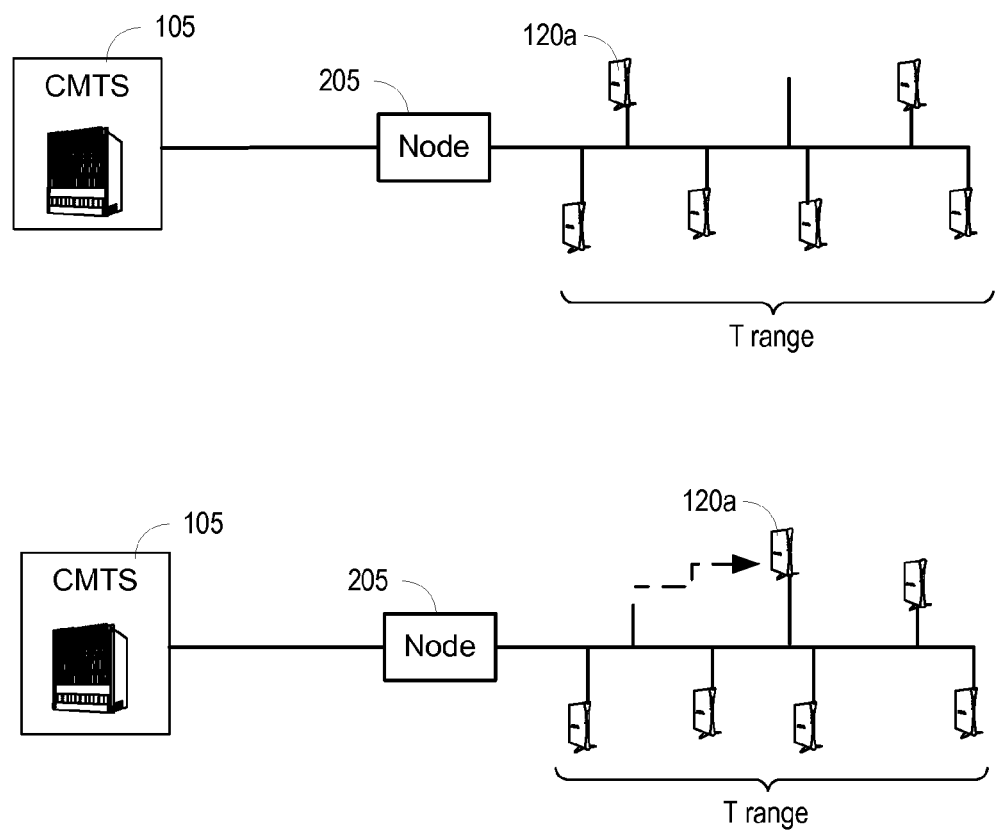
FIG. 3 is a diagram illustrating an example of a movement of an authorized device to another location on the network.

FIG. 3 is an illustration of an example implementation in which user devices 120 connect to a modulation/demodulation device, such as CMTS 105, located at a headend 110. Multiple user devices 120 can be connected to the headend via one or more nodes 205. The node 205 might be, for example, a fiber optic node of an HFC transport network. The node 205 might also be, for example, an RFoG transmitter/receiver at the headend.

FIG. 3 illustrates a situation in which a user device 120a has been moved from one part of the network to another. For example, a cable modem connected to a coaxial cable outlet in one room of a residence might be moved to another room and connected to the coaxial cable outlet of that room. As another example, the movement can be of a DOCSIS compliant set-top box. When a user device 120a is authorized to receive a service, such as when a DOCSIS compliant cable modem is authorized to receive data service, a subscriber can provide one of his or her user devices 120 to a non-subscriber such as, for example a neighbor. The device might still be authorized by the network to receive signals, resulting in the provision of services to both the subscriber and the non-subscriber user. The subscriber might, for example, decide to split the bill for services with the non-subscriber. Whatever type of arrangement exists between the subscriber and the unauthorized user, there is the potential that a service provider such as an MSO can lose a substantial amount of revenue due to such fraudulent sharing of devices.

When a user device 120 is physically moved, even if it is from one room to another, the result will be a change in the timing delay and timing offset of the user device 120. There can be many factors that influence the timing delay. Significant amongst these factors are the length of the cables (i.e., physical distance of the path between the user device 120 and the receiving device CMTS 105, for example). Other factors that can influence the timing delay can include the downstream modulation scheme and interleave depth, the upstream modulation scheme and channel width, the model of the user device 120 and the firmware running on the user device, and even the temperature surrounding cabling.

A difference between the initial or previous timing delay and a subsequent timing delay can be used as a "red flag" to alert of potential fraud. In example implementations, fraud detection might be enhanced if the demographics of the neighborhood(s) in which the user devices 120 reside (or that a node 205 serves) are taken into account in conjunction with changes in the timing delay of the user device 120. In particular, a movement resulting in a delay of a certain number of ticks might, for example, correspond to a conservative estimate that a user device 120 was moved 160 feet. If a subscriber resided on a large lot or estate and had multiple user devices 120, such as a cable modem and a gateway device or set-top box, for example, then a movement of a user device 120a a distance of 160 feet might constitute a move from one part of the residence to another, considering the size of the estate. To consider as a factor data regarding whether a subscriber lives in an estate, suburb, or rural area can eliminate a "false positive." On the other hand, in a multiple-dwelling unit (MDU) neighborhood, such as an apartment complex, if a user device 120a was moved 160 feet, such a move might have exceeded the bounds of the subscriber's residence, which can be another factor indicating that the subscribe might be either sharing the device with a non-subscriber neighbor, or might have given the device to a non-subscriber neighbor.

In some implementations, to consider the demographics and the timing delay of the user devices 120, a process can be performed in which timing data from all available user devices 120 on a node 205, for example, can be collected. Subscriber account data from a subscriber billing database, for example, can also be imported.

In some implementations, every user device 120 on a node can be considered for the analysis. Recorded in a database, for example, can be information regarding which node is associated with which user devices 120, or viewed another way, which user devices 120 are associated with which nodes.

In other implementations, a radius of the coaxial plant served by the node 205 (the coaxial portion of an HFC network extending from the node 205 to the subscriber homes) can be considered. To consider devices within this radius, the minimum timing offset can be subtracted from the timing offset of each user device 120. The resulting value can represent the CMTS's timing constant, plus the time induced by the signal's propagation through the fiber to the node. Then, the difference in timing offset between the user devices having the minimum timing offset and maximum timing offset can represent a radius of the coaxial plant served by the node 205.

Each subscriber account, which can be found in the records of a subscriber billing database for example, can contain information regarding the subscriber's physical location (e.g., residential street address), and the MAC address of one or more user devices 120 associated with the subscriber's account. Tests can be performed to verify how the accounts are distributed within the area served by the node 205 associated with the user devices 120. This data can then be used to estimate the demographics of the area.

Figure 4:
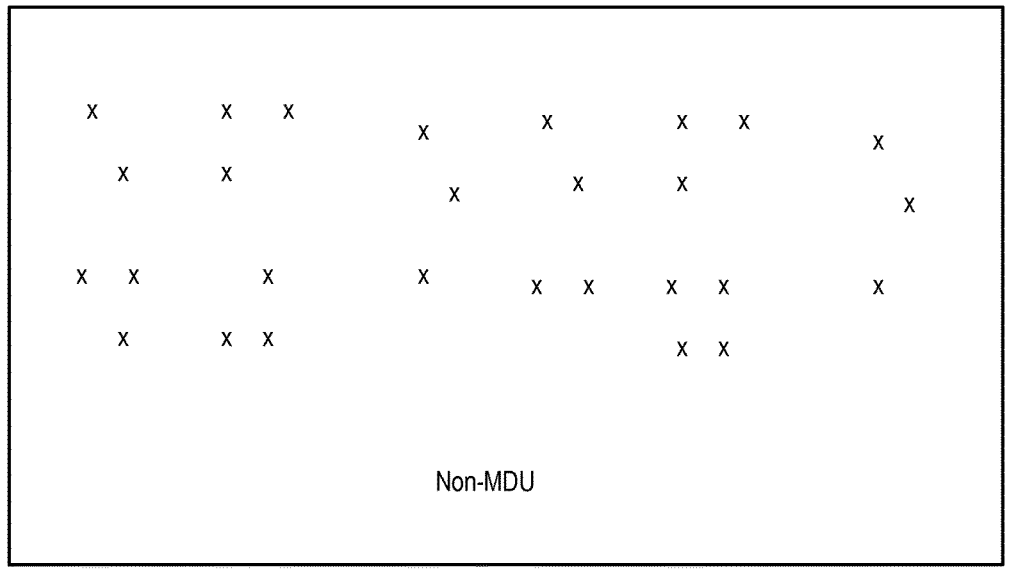
FIG. 4 is a diagram illustrating another example of a movement of an authorized device to another location on the network.
Figure 4:
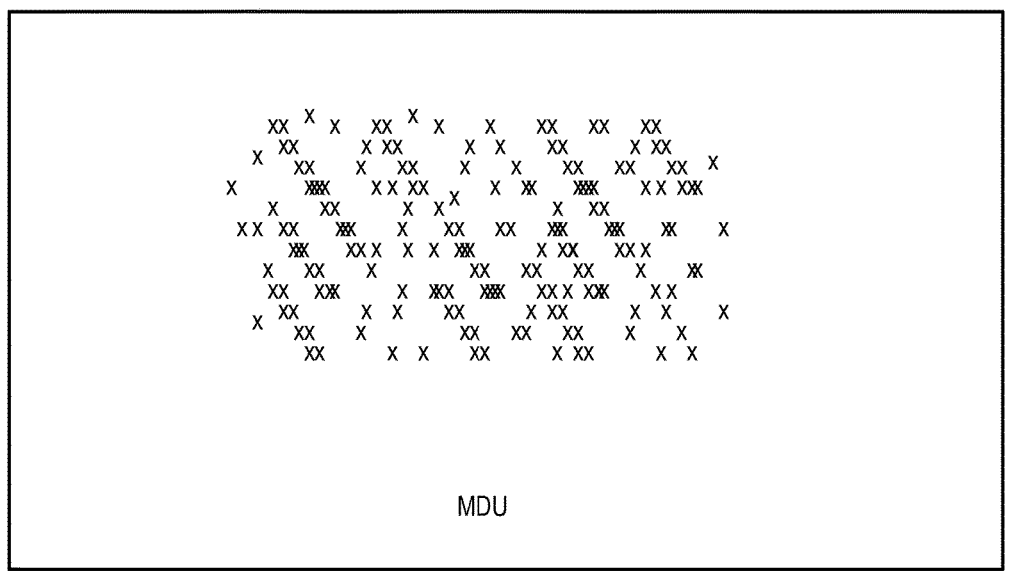

FIG. 4 is an illustration of an example of a map that can be generated in some example implementations. In such example implementations, each user device 120 can be plotted on a map indicating the street address where the user's device 120 resides. Such a map can show the density of user devices 120 associated with a node 205. With or without the generation of a map, the physical distance between the user devices 120 can also be calculated, based on the address where each user device 120 resides. A user device 120 can be equipped with mobile technology and GPS or triangulation can also be used to determine the physical location to a higher degree of accuracy or resolution. A large number of accounts, each with relatively few user devices 120 that densely populate a small radius around a node 205, can indicate that the subscribers live in a MDU. Conversely, a small number of accounts, each with many user devices 120, but spread out in a large radius around the node 205 can indicate a subscriber population that might reside in large lots or estates. Rural areas and suburbia can have distinct characteristics too.

As mentioned above, if the change in the timing offset of a user device 120a indicates that it was moved 160 feet, for example, then such a move might have exceeded the bounds of the subscriber's residence if the residence is a unit of a MDU, and thus can be indicative of fraud.

Figure 5:
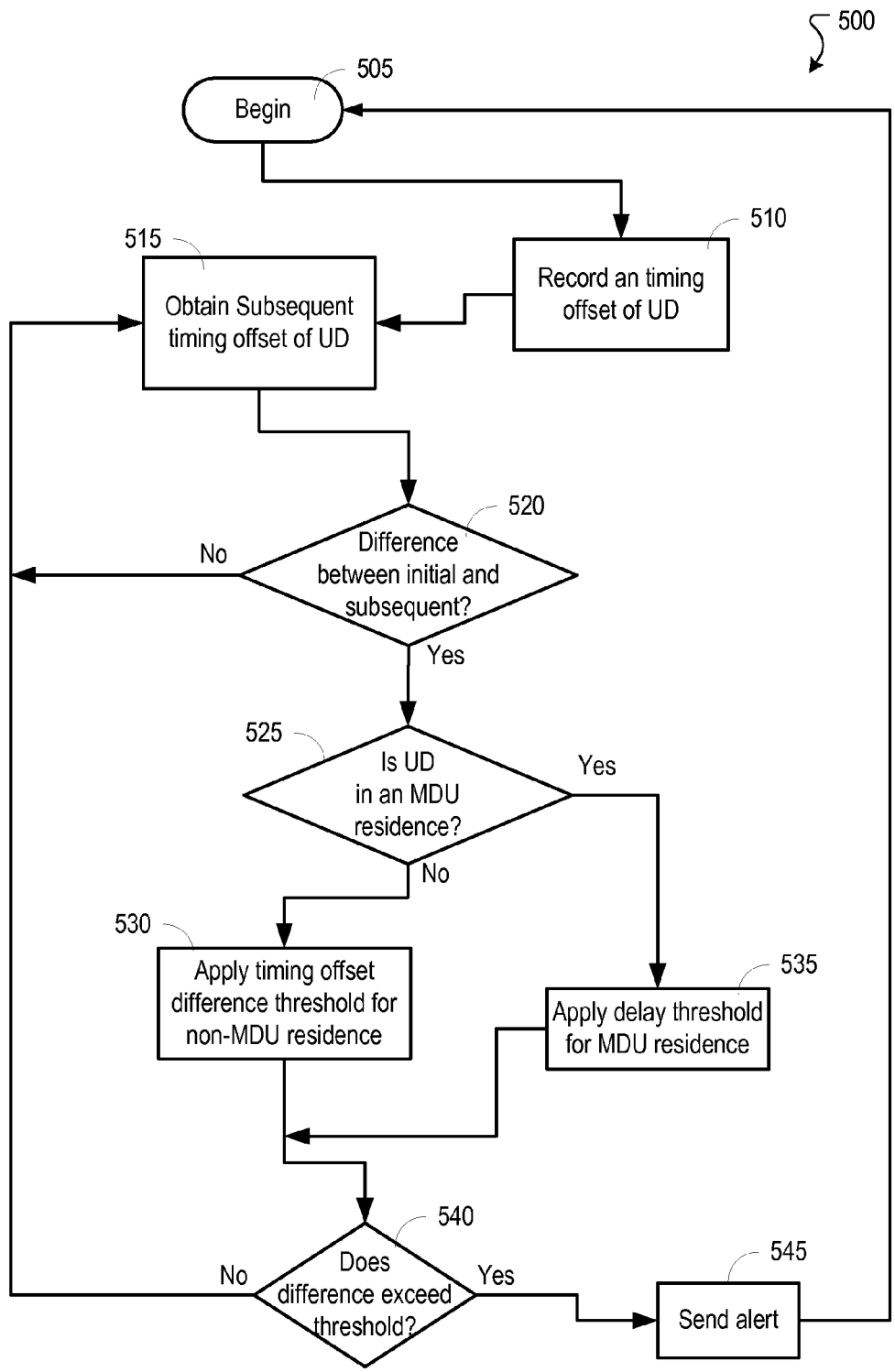
FIG. 5 is a diagram illustrating yet another example of a movement of an authorized device to another location on a separate node of the network.

FIG. 5 is a flowchart illustrating an example process 500 for alerting of a potential fraud perpetrated by the movement of a user device. The example process can be performed by a software module (e.g., fraud detection software 125 of FIG. 1). The process 500 can begin at stage 505 wherein one or more user devices, which can be user devices 120 of FIG. 1, for example, have initialized and have timing offset values. As is typical in many networks, such a ranging process or the like can be performed periodically and the data regarding timing offsets of devices is typically not stored for comparative purposes.

At stage 510, the timing offset of a user device, can be recorded in a database. The timing offset can be recorded, for example, by a user device (e.g. user device 120 of FIG. 1). In some implementations, the fraud detection software can obtain these values from the CMTS (e.g., CMTS 105 of FIG. 1), and record them in a database.

At stage 515, when a ranging process is repeated for user devices, a subsequent timing offset, can be obtained for user devices. The subsequent timing offset can be obtained by fraud detection software (e.g., fraud detection software 125 of FIG. 1) from the CMTS (e.g., CMTS 105 of FIG. 1).

At stage 520, a comparison can be made between the difference, if any, between the earlier timing offset and the subsequent timing offset. The comparison can be made, for example, by the fraud detection software (e.g., fraud detection software 125 of FIG. 1).

At stage 525, if there is a difference between an earlier timing offset and a subsequent timing offset for a user device, it can be determined whether the physical location of the user device and the physical locations of other user devices on the same node (or, within a radius of the coaxial plant served by the node) might indicate that the user device having the timing offset difference is at an MDU residence. The determination can be made, for example, by fraud detection software (e.g., fraud detection software 125 of FIG. 1). As mentioned above, a large number of accounts, each with relatively few user devices 120 that densely populate a small radius around a node, can indicate that the subscribers live in a MDU. Conversely, a small number of accounts, each with many user devices, but spread out in a large radius around the node can indicate a subscriber population that might reside in large lots or estates.

At stage 525, if it is determined that a user device 120 likely resides at a non-MDU residence, then at stage 530, a timing offset difference for non-MDU residences can be used as a threshold for alerting as to a potential fraud. The timing offset difference to be applied to a user device (e.g., user device 120 of FIG. 1) likely at an MDU residence will be smaller than that for a user device residing in non-MDU residences. As mentioned above, if a subscriber resided on a large lot or estate and had multiple user devices, a movement of a user device a distance of 160 feet might constitute a move from one part of the residence to another, considering the size of the estate. On the other hand, in an MDU neighborhood, such as an apartment complex, if a user device was moved 160 feet, such a move might have exceeded the bounds of the subscriber's residence. Thus, a lower threshold difference can be required to trigger an alert for an MDU residence.

At stage 540, if the difference threshold is exceeded, then an alert can be sent at stage 545. The alert can be sent, for example, by the fraud detection software (e.g., fraud detection software 125 of FIG. 1). Such an alert can be in the form of a report that is generated of the potentially offending user devices (and/or subscribers), or some other type of notification (digital message, for example) transmitted in some form (by instant message, for example). A person or persons receiving the alert can then take whatever appropriate action to prevent the continuing fraud.

Figure 6:
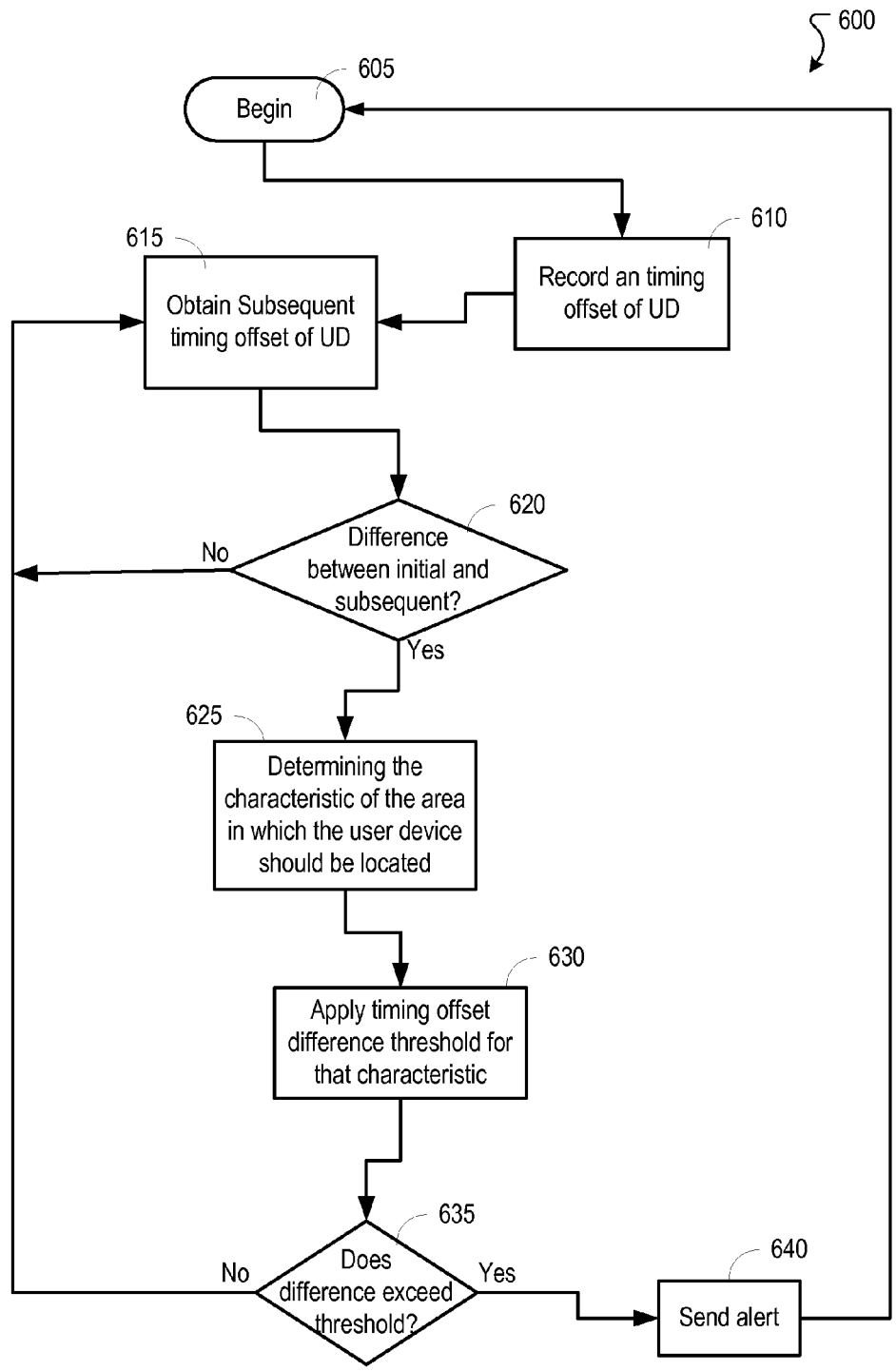
FIG. 6 is a flow diagram illustrating an example process that may be performed by a software module that uses physical location information and difference in timing delays to alert of possible fraud.

FIG. 6 describes another example process of an alert that can be performed. Stages 605 through stage 620 can mirror the example stages presented in FIG. 5.

At stage 625, if there is a difference between an earlier timing offset and a subsequent timing offset for a user device, the characteristics of the area in which the user device should be located can be determined. The characteristics of the area in which the user device should be located can be determined, for example, by fraud detection software (e.g., fraud detection software 125 of FIG. 1). In some examples, it can be determined whether the physical location of the user device and the physical locations of other user devices on the same node (or, within a radius of the coaxial plant served by the node) might indicate that the user device having the timing offset difference is at an MDU residence. Thus, the characteristic of the area might be that of an MDU residence. As mentioned above, a large number of accounts, each with relatively few user devices that densely populate a small radius around a node, can indicate that the subscribers live in a MDU. Conversely, a small number of accounts, each with many user devices, but spread out in a large radius around the node can indicate a subscriber population that might reside in an area having the characteristic of large lots or estates.

Other characteristics may include the characteristics of suburbs or rural areas. For example, a rural area has clusters of user devices that are widely spread out just like an area with a lot of large estates. However, the number of user devices in each cluster will vary. Thus, if there is an estate every two miles, each cluster will tend to have a large number of user devices when compared to rural properties (e.g., two farm-houses) that are two miles apart. Thus, rural areas generally have large service radii like estates, but a much smaller device density. Most suburbs are characterized by their average density and service radius. In some cases, the device density of MDUs (especially for "up-scale" areas) may even approach that of suburbs, but the MDU will have a much smaller service radius.

At stage 630, different timing offset difference thresholds can be associated with different area characteristics. The different timing offset thresholds can be associated with different area characteristics, for example, by fraud detection software (e.g., fraud detection software 125 of FIG. 1). For example, if it is determined that the characteristic of the area in which the user device 120 resides should be that of an MDU, then the timing offset difference thresholds for an MDU residences can be used as a threshold for alerting as to a potential fraud. As mentioned above, the timing offset difference to be applied to a user device 120 likely at an MDU residence will be smaller than that for a user device 120 residing in non-MDU residences. As mentioned above, if a subscriber resided on a large lot or estate and had multiple user devices 120, a movement of a user device 120a a distance of 160 feet might constitute a move from one part of the residence to another, considering the size of the estate. On the other hand, in an MDU neighborhood, such as an apartment complex, if a user device 120a was moved 160 feet, such a move might have exceeded the bounds of the subscriber's residence. Thus, a lower timing offset difference threshold can be required to trigger an alert for an MDU residence.

At stage 635, if the difference threshold is exceeded, then an alert can be sent at stage 640. The alert can be sent, for example, by the fraud detection software (e.g., fraud detection software 125 of FIG. 1). Such an alert can be in the form of a report that is generated of the potentially offending user devices (and/or subscribers), or some other type of notification (digital message, for example) transmitted in some form (by instant message, for example). A person or persons receiving the alert can then take whatever appropriate action to prevent the continuing fraud. These persons can also include persons related to processing, for example, 911 emergency calls.

Any of the devices (e.g., CMTS, cable modems, EMTAs, etc.) and components thereof, or software modules/programs described in this disclosure, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube), LCD (liquid crystal display), LED (light emitting diode) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A method for alerting of a movement of a user device comprising:
    recording a first timing offset for a user device;
    obtaining a subsequent timing offset for the user device;
    determining whether a difference exists between the first timing offset and the subsequent timing offset;
    if a difference exists between the first timing offset and the subsequent timing offset, then, based on a subscriber address associated with a subscriber account associated with the user device, determining a population density characteristic of a premises location within which the user device should be located;
    applying a timing offset difference threshold related to the characteristic; and
    if the timing offset difference threshold related to the characteristic is exceeded, then performing an alert.

2. The method of claim 1, wherein the population density characteristic comprises an indication of a multiple dwelling unit (MDU).

3. The method of claim 1, wherein the population density characteristic comprises an indication of a suburb.

4. The method of claim 1, wherein the population density characteristic comprises an indication of a rural area.

5. The method of claim 1, wherein the population density characteristic comprises an indication of large estates.

6. The method of claim 1, wherein the alert is processed and the movement of the device is recorded for emergency purposes.

7. A method for alerting of a movement of a user device comprising:
    recording a first timing offset for a user device;
    obtaining a subsequent timing offset for the user device;
    determining whether a difference exists between the first timing offset and the subsequent timing offset;
    if a difference exists between the first timing offset and the subsequent timing offset, then, based on a density associated with a plurality of other user devices located in an area encompassing the user device, determining a population density characteristic of a premises location within which the user device should be located;
    applying a timing offset difference threshold related to the population density characteristic; and
    if the timing offset difference threshold related to the population density characteristic is exceeded, then sending an alert.

8. The method of claim 7, wherein the population density characteristic comprises an indication of a multiple dwelling unit (MDU).

9. The method of claim 7, wherein the population density characteristic comprises an indication of a suburb.

10. The method of claim 7, wherein the population density characteristic comprises an indication of a rural area.

11. The method of claim 7, wherein the population density characteristic comprises an indication of large estates.

12. The method of claim 7, wherein when the alert is triggered, the movement of the device is recorded for emergency purposes.

13. The method of claim 7, wherein the density of other user devices located in an area encompassing the user device is estimated based upon a number of addresses associated with the plurality of other user devices that are within a service radius of the address associated with the user device.

* * * * *